US006542179B1

(12) United States Patent
Kurtz et al.

(10) Patent No.: US 6,542,179 B1
(45) Date of Patent: Apr. 1, 2003

(54) LIGHT INTEGRATING SYSTEM WITH REDUCED DYNAMIC SHADING

(75) Inventors: Andrew F. Kurtz, Rochester, NY (US); Allen D. Bellinger, Webster, NY (US); Gregory O. Moberg, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/163,619

(22) Filed: Sep. 30, 1998

(51) Int. Cl.[7] .................... H04N 5/253; G02B 21/36
(52) U.S. Cl. ..................... 348/97; 348/96; 359/362
(58) Field of Search .................... 348/96, 97, 107, 348/335, 344; 359/362, 365, 366; 355/67

(56) References Cited

U.S. PATENT DOCUMENTS

| 4,868,383 A | | 9/1989 | Kurtz et al. |
| 5,012,346 A | * | 4/1991 | Dejager et al. ............... 348/97 |
| 5,046,793 A | | 9/1991 | Hockley et al. |
| 5,155,596 A | * | 10/1992 | Kurtz et al. .................. 348/97 |
| 5,241,459 A | | 8/1993 | Kaplan et al. |
| 5,257,340 A | | 10/1993 | Kaplan |
| 5,274,228 A | | 12/1993 | Kaplan |
| 5,363,232 A | * | 11/1994 | Tokue ......................... 359/234 |
| 5,392,080 A | | 2/1995 | Galt et al. |
| 5,414,460 A | * | 5/1995 | Niertit et al. ................ 348/97 |
| 5,428,387 A | | 6/1995 | Galt et al. |
| 5,471,327 A | | 11/1995 | Tedesco et al. |
| 5,528,288 A | * | 6/1996 | Sandor et al. ............... 348/97 |
| 5,534,386 A | | 7/1996 | Petersen et al. |
| 5,609,939 A | | 3/1997 | Petersen et al. |
| 5,650,843 A | | 7/1997 | Moberg et al. |
| 5,671,084 A | * | 9/1997 | Kurtz .......................... 359/362 |
| 5,672,864 A | | 9/1997 | Kaplan |
| 5,754,278 A | * | 5/1998 | Kurtz .......................... 359/365 |
| 6,023,367 A | * | 2/2000 | Kurtz .......................... 359/362 |
| 6,062,710 A | * | 5/2000 | Hewitt ........................ 359/19 |

OTHER PUBLICATIONS

"Kinoform Diffusers", by J.J. Caufield, SPIE Proceedings, vol. 25, Developments in Holography, 1971, p. 111–113.
"Spectral and Noise Characteristics of a 300–Watt Eimac Arc Lamp", R.L. Cochran et al, Analytical Chemistry, vol. 49, No. 13, Nov. 1977, pp. 2040–2043.
"Optical Scanning Systems for a CCD Telecine for HDTV" by Kurtz et al, SPIE Proceedings, vol. 1448, Camera and Input Scanner Systems, 1991, p. 191–205.
"Monte Carlo Calculation of Light Distribution in an Integrating Cavity Illuminator", by M. Kaplan, SPIE Proceedings, vol. 1448, Camera and Input Scanner Systems, 1991, p. 206–217.

* cited by examiner

*Primary Examiner*—Wendy R. Garber
*Assistant Examiner*—Lin Ye
(74) *Attorney, Agent, or Firm*—Francis H. Boos, Jr.; Roland R. Schindler, II

(57) ABSTRACT

A film scanner illuminant system with a light integrator module for creating an homogenous light illuminant from a light source. Temporal variations in light beam profiles from the light source which introduce low level temporal variations in the spatial homogeneity of light from the integrator are reduced below level of perceptibility by use of a light shaping diffuser to diffuse the beam of input light at the light input port of the light integrator. Preferably asymmetric light diffusers are used although some additional advantage is obtainable by use of spherical diffusers. The diffuser may be used with a variety of known light integrator configurations.

15 Claims, 5 Drawing Sheets

LIGHT INTEGRATING SYSTEM WITH REDUCED DYNAMIC SHADING

FIELD OF THE INVENTION

This invention relates generally to the field of light illumination sources for film scanners of the type which use a light integrating module, such as a cavity or cladded light conducting rod, having an entry port to accept an input beam of light which is then conditioned internally to produce a spatially homogenized illuminating region of light emanating from an exit port of the module.

BACKGROUND OF THE INVENTION

Various arrangements are known in the prior art for providing an illumination system for a film scanner that utilize a light integrating module. The design of a light integrating module, as part of an illuminator in a film scanner, is well known in the art. The basic concept of a light integrator is the use of a substantially enclosed volume provided with an interior white diffusing surface of high reflectivity. The volume may comprise a spherical or cylindrical cavity or a coated or cladded light conducting rod. A beam of light projected into the enclosed volume through an input port undergoes at least one and, more preferably, multiple reflections to create a highly diffuse light which eventually exits through an exit port. In U.S. Pat. No. 5,012,346 (DeJager et al.), an illumination system is shown in which light from a broadband high intensity light source is condensed by a system of lens elements into a linear cylindrical integrating cavity. The cylindrical cavity conditions the light which subsequently exits the elongated output slit aperture so as to provide both angularly diffuse and spatially uniform illumination, while maximizing cavity light efficiency. The illuminated film is scanned by imaging it onto one or more sensor arrays, each of which consists of a series of regularly placed photosensitive pixels, which in turn provide the signals that are subsequently converted into the digital data. The film is driven at a uniform rate past the output slit, such that image data is collected in a regular fashion, frame by frame. There are numerous applications for such a scanner, including as a specialized device referred to as a telecine film scanner, which is used in digitizing image frames on motion picture film.

In this U.S. Pat. No. 5,012,346 as well as in U.S. Pat. No. 4,868,383 (Kurtz et al.), a linear cylindrical is described in which light is input through a port in the middle of the curved cylindrical length of the cylindrical cavity. In U.S. Pat. No. 5,241,459 (Kaplan et al.) and U.S. Pat. No. 5,650,843 (Moberg et al.), an alternative design for a linear cylindrical cavity is described in which light is input at an angle through an off-centered port located in an end wall of the cavity. In U.S. Pat. No. 5,257,340 (Kaplan), U.S. Pat. No. 5,274,228 (Kaplan) and U.S. Pat. No. 5,672,864 (Kaplan), the light is input through an input port on the end of a coated or cladded light conducting elongated rod. Spherical light integrator configurations are also known.

The spatial profile of the input beam typically is highly nonuniform, and the cross section of the beam often has a nominally gaussian intensity profile. When an arc lamp source is used, the input beam profile may also have dark regions within it from the shadows cast by the arc electrode support members. Careful design of the integrator ensures that light does not exit the cavity directly, that is, without at least one diffuse reflection, although most exiting light undergoes several diffuse reflections before exiting the cavity. As a result, the exiting light typically has a high spatial uniformity, with generally less than two percent variation across the usable length and width of the exit port. This is particularly important for a film scanner illuminator, as the need for later electronic pattern correction is reduced and the system signal to noise ratio is thereby enhanced. Likewise, a highly diffuse (typically lambertian) film illumination is valuable as it compensates for scratches and dust on the film, thereby reducing visible artifacts in the transferred image.

Frequently in the design of a color film scanner, particularly those with a high throughput, specifications require the use of a high intensity light source with a broadband visible spectrum. Generally, only an arc lamp will satisfy the requirements; a xenon arc lamp typically being the preferred choice. Unfortunately, due to phenomena such as arc wander, the light output of such arc lamp sources fluctuates in time over a broad frequency range under about 1 kHz.

The above patents describe feedback control systems which sample light from the integrating cylinder and then compensate for these temporal light level fluctuations with continuous modulation of current supplied to the lamp source. The light output of these arc lamps can also be affected by gas turbulence, which casts wave-like time varying shadows through the already non-uniform spatial profile of the output light beam. These shadows move relatively slowly, and provide a frequency space noise in a range of near DC to about 10 Hz. Integrating cylinders of the type described above are reasonably effective in homogenizing these moving shadows, such that on a macro scale, the light exiting the output slit is still substantially uniform. However, it has been found that, even in existing film scanner systems utilizing the types of integrating cylinders described in the above patents, these shadows can create localized dynamic non-uniformities within the integrator, which in turn, can be detected as localized noise on a pixel by pixel basis in the scanned image. The feedback current compensating control systems described in the foregoing patents have been found to be not entirely able to correctly current compensate for these variations. The reason is believed to be that the sampled light from a defined region within the integrator does not necessarily have the same spatial and temporal signature as light elsewhere in the integrator. In the above mentioned '843 patent, an attempt to alleviate this problem is described which used a light diffuser at the feedback port to spread the region from which sampled light is obtained. Although this approach is considered to be an improvement over prior feedback arrangements, it has been found that further improvement is needed to achieve the uniformity in light output required for critical film scanning applications.

It is therefore the object of the present invention to provide an illumination system for a film scanner which includes a light integrator module which efficiently provides uniformly diffuse light at the scanning light output port with substantial removal of localized dynamic temporal variations from the film scanning output light.

It is a further object of the invention to provide light integration apparatus for a film scanner which provides uniformly diffuse light at the scanning light output port with substantial removal of localized dynamic temporal variations from the film scanning output light.

SUMMARY OF THE INVENTION

In accordance with the invention therefore, light integrating apparatus for producing a spatially homogenized illuminating region of output light from an intense beam of input light comprising an integrating module having diffusely reflecting walls defining an input port through which said beam of input light is introduced into said module and an output port through which the output light exits after multiple reflections within said module; and a light shaping diffuser positioned at the input port, the diffuser having a light shaping diffusion characteristic which increases the multiple reflections within the integrating module without significantly increasing direct transfer of input light to said output port.

In accordance with another aspect of the invention, there is provided an illumination system for a film scanner which comprises a light source having an output light beam; optical means for condensing the output light beam into a focused light beam having spatial and temporal light intensity variations distributed along an optical axis of the beam; a light integrating module having (a) a light input port positioned in the optical axis of the focused light beam, (b) diffusely reflecting interior walls and (c) an output port through which illumination from said light beam exits the module after multiple reflections within the module; and a light shaping diffuser positioned at said input port, the diffuser having a light shaping diffusion characteristic which increases the multiple reflections within the integrating module without significantly increasing direct transfer of light from said input port to said output port.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
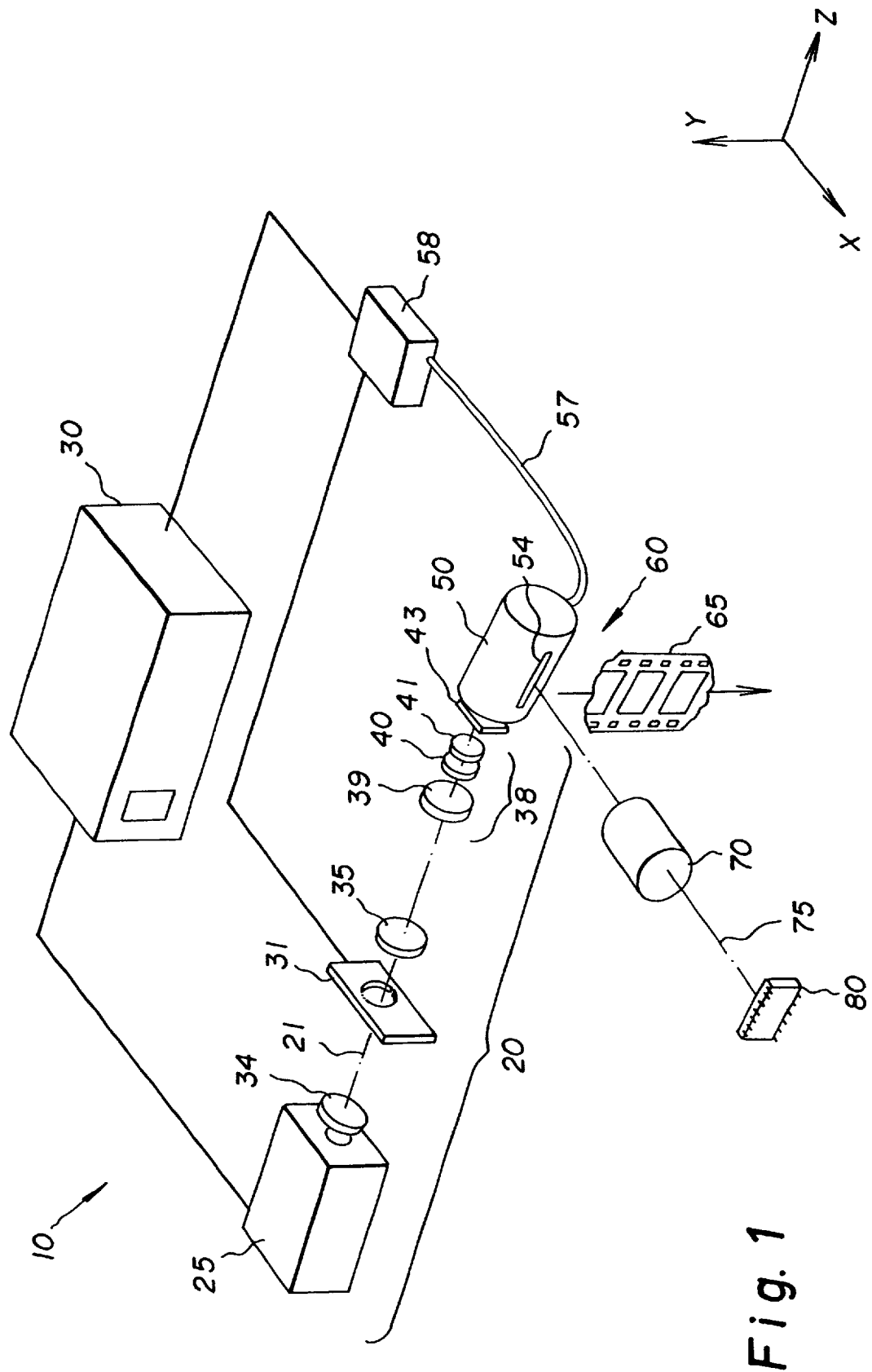
FIG. 1 is a schematic perspective view showing the illumination system of the present invention in combination with certain elements of a film scanner.

In FIG. 1, an embodiment of the present invention for a film illumination system is shown in the context of a linear film scanner 10. The film scanner 10 includes an illumination optics system 20, inclusive of an integrating module 50, a film gate 60, an imaging lens 70, and a sensor array 80. Film 65 is conveyed through a film gate 60 located in front of illuminant exit port 54 of integrator 50. Imaging lens 70 is positioned so as to image illuminant from the integrator 50 transmitted through the film 65 onto the sensor array 80 at a predetermined magnification. The sensor array 80 has a linear configuration of adjacent photosensitive pixels which convert the image information into a line of digital data. As the film 65 moves through the film gate 60, line after line of image data is captured, and this data is subsequently processed to reconstruct each complete frame image. Sensor array 80 is shown for simplicity as a single device, although it should be understood that there may be one or more sensor arrays, usually accompanied by a color discriminating beam splitting means. Sensor array 80 may comprise any well known linear photosensitive device, such as, for example, a charge coupled device (CCD).

Illumination optics system 20 includes a high intensity light source 25, such as a xenon arc lamp, a first relay lens 34, second relay lens 35, and a condensing lens assembly 38 made up of three lens elements 39, 40 and 41 which serve in known manner to condense the light beam from light source 25 into a focused light beam for entry into light integrator 50. In accordance with the invention, a light shaping diffuser 43 is provided at the light input port of the light integrator to diverge the beam of input light at the light input port, the diffusion characteristic of which will be described in more detail subsequently.

Integrating cylinder 50 can be constructed from aluminum and the cylindrical inner cavity coated with a highly reflective diffuse white paint, such as Spectraflect (from Labsphere, Inc., North Sutton, N.H.). The known manner of operation of the integrating cylinder is such that at each incident point on the surface of the cavity, the input beam is diffusely reflected in a lambertian manner, and the light is scattered throughout the cavity. While some light exits the cavity immediately, through either the input port or the exit slit, most of the light hits the cavity wall and is diffusely reflected a second time, and preferably numerous times, before exiting the cavity or being absorbed. As a result of the numerous diffuse reflections within the cavity of the integrating cylinder 50, the light exiting the exit port 54, which is shaped in the form of an elongated slit, is spatially uniform, angularly homogenous and nearly lambertian. For scanning 35 mm film, the linear exit port 54 is typically about 25 mm in length in the line scan direction, that is across the width of the film, and about 3 mm in width in the longitudinal scan direction, that is in the longitudinal direction of the film. Imaging lens 70 collects light within a small angular width (a 9° cone for example) as compared to the essentially lambertian emission from the linear exit port 54. Imaging lens 70 only collects light from a wider angular range (out to about 50°) when the light has been redirected into the lens by a scratch or other phase artifact on the film 65.

For scanning of color films, light source 25 is a white light lamp, such as a tungsten halogen lamp, a metal halide arc lamp, or a xenon arc lamp. Generally, xenon arc lamps have a whiter emission (more blue light) and are brighter sources (more light from a smaller area) than tungsten halogen lamps, and are therefore preferred in applications where a high throughput (for example, 30 film frames/second) is required. In particular, for this discussion, light source 25 is an ILX-300f compact short arc xenon arc lamp from ILC Technology of Sunnyvale Calif. Light source 25 is operated in a CW manner, via power supply 30, rather than pulse width or pulse amplitude modulated. Light level control is provided by the illumination control circuit 58, which monitors the light level within the integrating cylinder 50 via light sampling means 57. This light sampling means 57 typically consists of a fiber optic bundle or a light pipe which conducts light to an optical detector in the illumination control circuit 58. The illumination control circuit 58 is used to provide both a coarse light level adjustment by means of adjustment of an aperture mechanism 31 as well as a fine light level adjustment by means of current control of lamp power supply 30. The details of this feedback control are known in the art, as disclosed in U.S. Pat. No. 5,528,288 (Sandor et al.) and need not be described further here.

Figure 2:
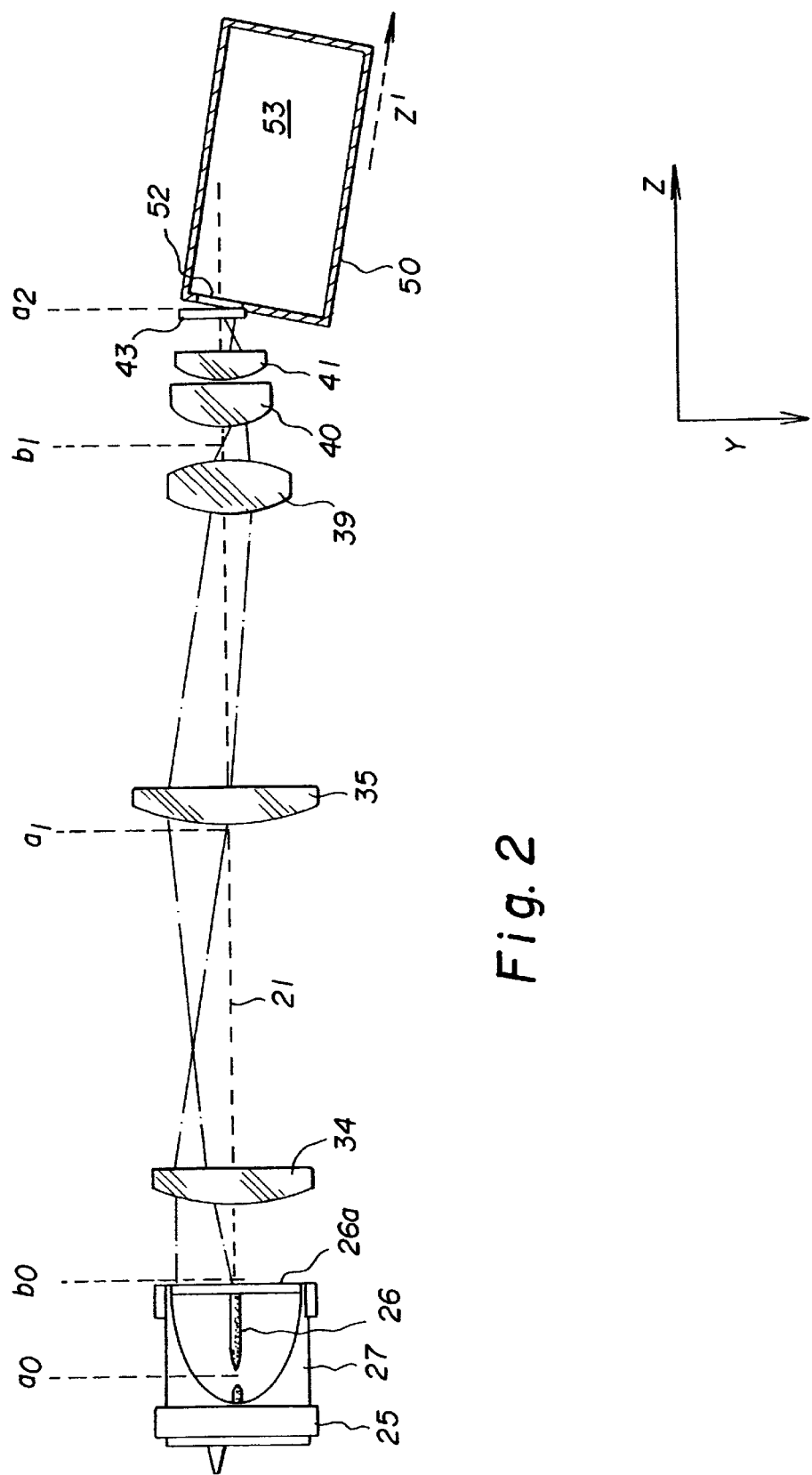
FIG. 2 is a side view of the illumination system shown in FIG. 1.

FIG. 2 shows a side view of the illumination system portion 20 of the film scanner 10 of FIG. 1 in greater detail. The light source 25, a xenon arc lamp, is a complex structure whose main features are an emission volume (plasma "ball") in the area of plane $a_o$ where the arc crosses between the anode and cathode (electrode 26), electrode supports (not shown), a reflector 27, and an exit window approximately at plane $b_0$. The light profile in the $a_o$ plane is substantially non-uniform, being generally gaussian in shape (along the optical axis 21). As the light exits the lamp, it passes through a plane, labeled as $b_0$, which generally corresponds to a Koehler illumination plane, where the light profile would be expected to be fairly uniform. Typically, the improved uniformity at a Koehler plane is the result of the overlap of light from the many source points that emit light. However, in the case shown in FIG. 2, the light source 25 has the electrode 26 and electrode support structure 26a (a tripod configuration) which interferes with this effect, as it obstructs light and casts shadows into the beam. Thus, while either the emitting area at $a_0$ or the exit face at plane $b_0$ can be used as the effective source for the design of the optical system, the initial light profile is substantially non-uniform.

In the optical system of FIG. 2, the conventional design approach of imaging both objects (sources) and pupils in cascading fashion is used throughout the design. In detail, the planes $a_0$ $a_1$, and $a_2$ share conjugacy. Relay lens 34 works in combination with the concave reflector 27 to image the arc (plane $a_0$) to just prior to the second relay lens 35 (plane $a_1$). With the help of the relay lens 34 and the first condensing lens 39 (both of which act like field lenses), the second relay lens 35 images the exit face (plane $b_0$) of the light source 25 to plane $b_1$, which is located within the condensing assembly 38. Finally, the second relay lens 35, together with the lenses of the condensing lens assembly 38, image the $a_1$ plane image of the arc to the $a_2$ plane, thereby providing the desired beam focus in the input port 52 of the integrating cylinder 50. This lens system portion of the illumination optics system 20 is designed primarily to transfer light as power, and not to preserve image quality. As a result, the far field image at the $b_1$ plane is highly aberrated, but still nonetheless distinguishable.

Figure 3A:
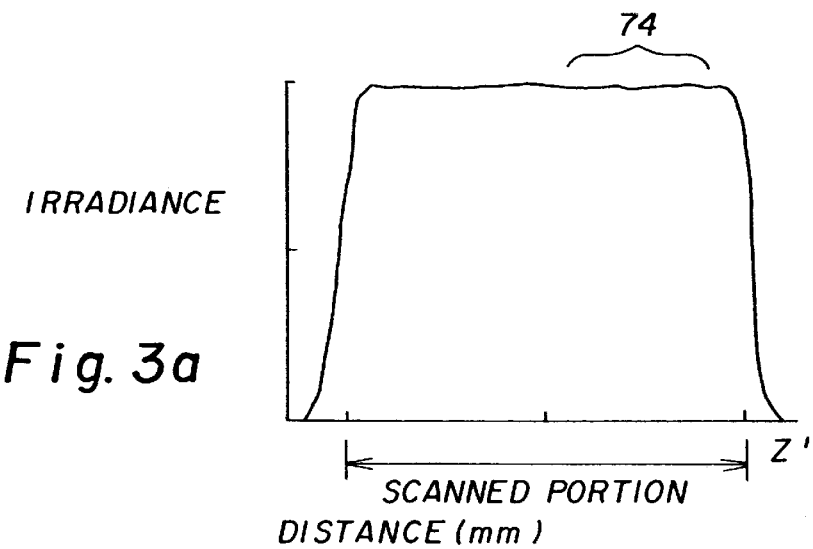
FIG. 3a is a graph of the spatial profile of the light exiting the linear exit port, along the longitudinal axis of the port.
Figure 4A:
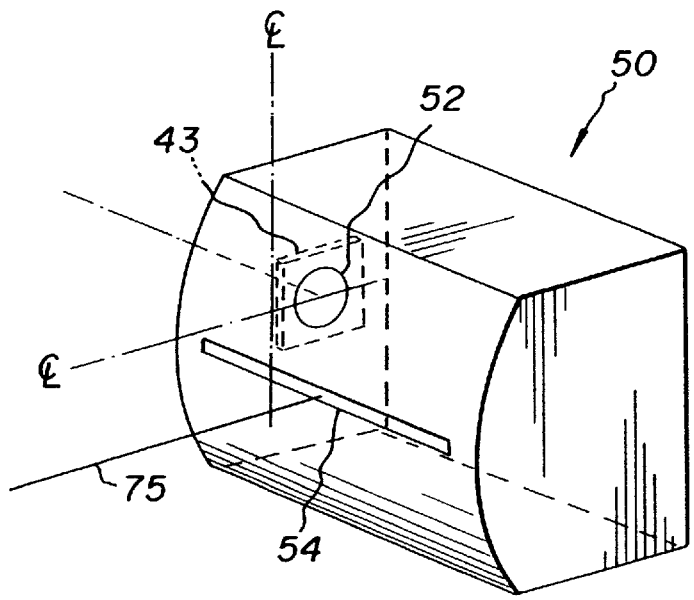
FIG. 4a is a perspective view of an end input illuminated integrating cylinder with a light shaping diffuser of the invention.
Figure 4B:
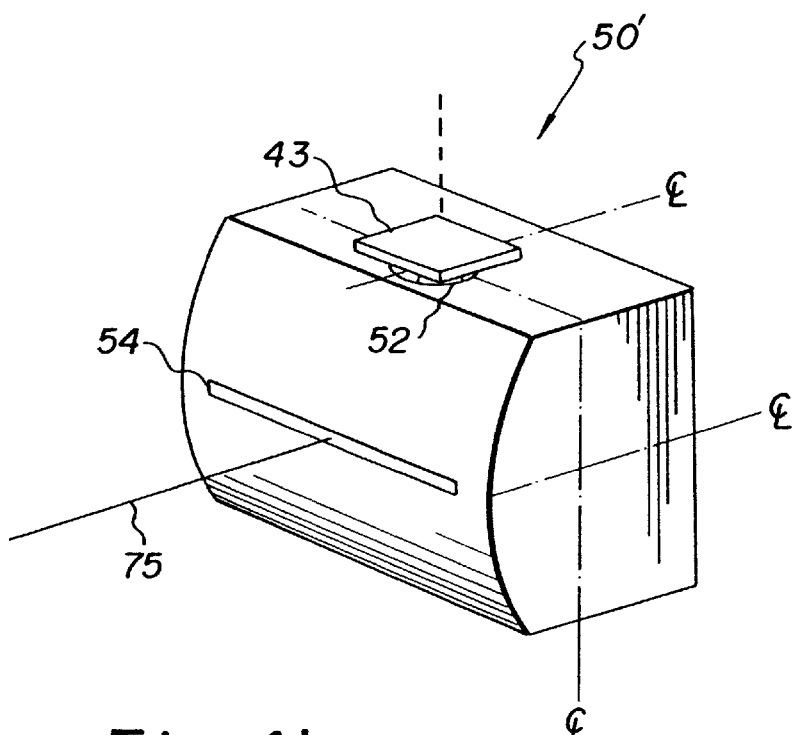
FIG. 4b is a perspective view of a top input illuminated integrating cylinder with a light shaping diffuser of the invention.

In the illustrated embodiment of FIG. 2, the integrating cylinder 50 is an end input illuminated design, following the design principles described in U.S. Pat. No. 5,241,459. Accordingly, the beam enters the integrating cylinder at a tilted angle from the axis of the integrator (about 13°) through an offset input port 52. This light is then incident onto the back inner wall of the cylindrical cavity 53, where at each point it diffusely reflects from the coated surface. FIG. 4a shows a perspective view of an end input illuminated integrating cylinder, showing the positional relationships of the input port 52 and linear exit port 54, relative to the cavity (denoted by center lines). The light exiting the linear exit port 54, as shown by the open gate (no film) irradiance profile in FIG. 3a, is very uniform, with only about 1.5% residual variance across the scanned portion of the slit, despite the asymmetrical design of the end input illuminated integrating cylinder. The effective pixel size, about 13 μm, is small relative to the about 25 mm illuminated length on the film. Alternately, the illumination optics 20 can be used in combination with the integrating cylinder shown in FIG. 4b, in which the light is directed into the cavity through a port located along the center line of the cylindrical wall. This integrating cylinder 50, is a basically symmetrical structure with "top" input illumination. It should be understood that the showing of the integrating cylinders 50 and 50' in FIGS. 4a and 4b depicts the outer surface of the integrators and that the interior surfaces are actually cylindrical as is well known in the art.

Figure 3B:
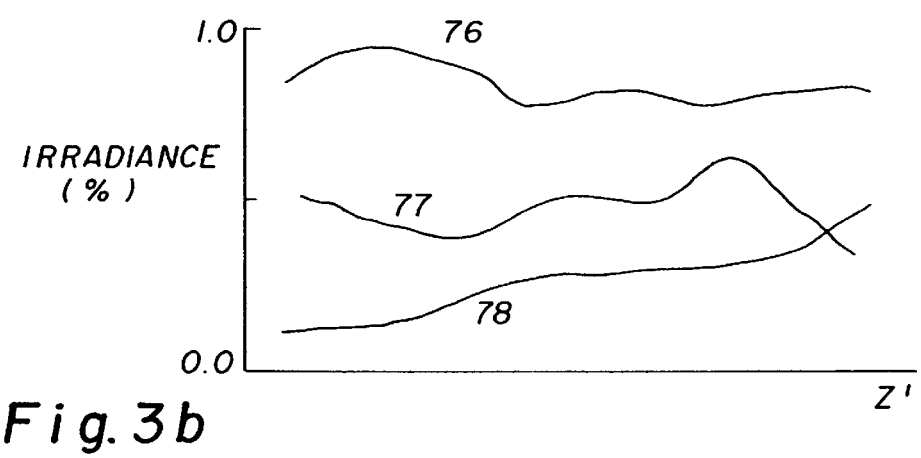
FIG. 3b is an expanded view of a portion of the FIG. 3a graph, in order to show the light behavior more locally.

FIG. 3b shows an expanded view of a portion 74 of the FIG. 3a irradiance profile, where lines 76, 77 and 78 illustrate the illumination profiles on a micro-scale across this portion of the scan line at separate points in time. The localized spatial variations over the length of line 76 are fairly small (about 0.5% pp). Furthermore, the variations from uniformity change very slowly, particularly when regarded on a pixel to pixel basis. When viewed through the sensor array 80, these local variations across the scan line remain small when reproduced. Assuming the profile were to remain unchanged over time, known image processing techniques in the form of electronic pattern correction which follow the sensor array 80 can compensate for spatial errors, including the 1.5% residual non-uniformity across the scan line. Unfortunately, the light profile is not static, but varies in time, and therefore cannot be pattern corrected. The lines 76, 77 and 78 are spatial profiles captured time sequentially and show that, on a micro scale, the spatial light pattern is temporally unstable. This localized dynamic variation, referred to as "shading" is a small effect (about a 0.9% pp variation) which occurs at rather low temporal frequencies (less than 10 Hz). Generally, this time varying effect is not visible, particularly when the images captured on the film have large density ranges and objects in motion. However, this dynamic shading can be perceptible when the scanned image which has a stationary and bright uniform field region. At 0.9% pp, this S/N for this effect is −41 dB, which, while low, is still above the generally recognized perceptibility threshold of −55 dB and therefore represents a problem.

It is well known that xenon arc lamps, such as the ILX-300f compact short arc, experience convection, in which the confined gases circulate within the lamp and dissipate heat. This internal gas turbulence in turn causes localized fluctuating variations in the optical index, which are then visible as shadows moving through the beam. In the case of the ILX-300f, the turbulence is generally visible along the outer rim of the lamp, and it is particularly visible in the upper quadrant of the beam when the lamp is horizontally mounted. The resulting shadowing, which generally appears wave-like, becomes increasingly visible as the beam propagates farther away from the arc plasma (plane $a_0$), and into the far field of the arc (such as at the lamp exit window at plane $b_0$). These shadows, relative to the brighter areas around them, are dark areas with local light levels about 4×lower. In a similar fashion, as the beam propagates through the illumination optics system 20, the turbulence is minimally visible at the planes $a_1$ and $a_2$ which are conjugate to the arc plasma (see FIG. 2), and the turbulence is correspondingly more visible at the $b_1$ plane, which is in the arc image far field. Thus, given that the illumination optics system 20 creates an arc image just inside the input port 52 of the integrating cylinder 50 (at plane $a_2$), as the beam propagates away from this focus and into the cavity 53, it is propagating into the far field, where the time varying shadowing effects become increasingly visible. In effect, the time varying wavelike shadow patterns are projected onto the internal walls of the integrating cylinder 50.

The integrating cylinder 50, as was described in the '459 patent, efficiently transforms the static near gaussian beam profile at the input focus to a uniform line of illumination at the linear exit port 54. Furthermore, as described in the '288 patent, this integrating cylinder 50 can still transform this near gaussian beam profile into a uniform line of illumination, even when the input beam is dynamically truncated by the aperture mechanism 31 (the blades close down in an iris like fashion). However, the present illumination system, including the integrating cylinder, cannot reduce the turbulence induced dynamic microfluctuations to below the perceptibility threshold. The incoming beam, including the changing shadows, are diffusely reflected off of the top surface of the integrating cylinder 50. The homogenizing action of the cavity does reduce the shadows significantly, from their about 4:1 contrast levels, to residual microfluctuations at an average noise level of about 0.9% pp (−41 dB) in the DC to 10 Hz range. The illumination control circuit 58 samples the light from a portion of the cavity 53 by means of a feedback port (not shown) which is situated so as to not directly see either the input port 52 or the linear exit port 54. The illumination control circuit 53 compensates for light level fluctuations over the entire lamp noise spectrum, including in the <10 Hz range, by using changes in the lamp current to alter the average output of the lamp. However, the performance of the circuit is dependent on the quality of the average lamp output that is sampled through the feedback port. In the original '383 patent, the light sampling means 57 was realized with a fiber optic bundle, which sampled the light from the integrating cavity over a limited angular range (about +/−15°). U.S. Pat. No. 5,650,843 describes various enhancements to the light sampling means 57, utilizing a light diffuser at the sampling port, such that the sampled light is collected from a larger portion of the cavity, thereby significantly reducing some localized flicker effects previously seen in the light emitted from the linear exit port 54. However, even with these improvements, the feedback port is still sampling and averaging the time variations in the light from samples taken from a portion of the cavity 53. Given the presence of residual microfluctuations across the cavity 53, the average light level in one area of the cavity is thus not the same as that in another portion of the cavity at any point in time. As a result, with the present integrating cylinder designs, while the control system vastly reduces the broad spectrum noise from current fluctuations in the lamp, it does not adequately remove the spatial noise (caused by the residual dynamic microfluctuations) across the entire length of the linear exit port 54.

Thus, enhancements to the illumination optics system 20 and the integrating cylinder 50 are necessary to further reduce this dynamic shading effect in the light output of the linear exit port 54. Principally, the input light needs to be further homogenized, so that both the dynamic and static spatial signatures of the lamp light profile are more fully removed. Referring again to FIG. 2, the requisite further homogenization of the light at the exit port of the integrator is accomplished by the positioning of light shaping diffuser 43 at the input port 52, nominally at or near the beam focus (plane $a_2$). As was discussed previously, as the light propagates into the integrating cylinder 50, it is moving into the far field, where the shadowing becomes increasingly visible. However, with the addition of the light shaping diffuser 43, these shadows can be significantly homogenized as they diverge into the cavity, before they even encounter the inner diffusing surfaces of the cavity. Given the asymmetrical nature of the end input illuminated integrating cylinder 50, this light shaping diffuser 43 preferably is provided with an asymmetric diffusing characteristic rather than symmetrical diffusing properties. In particular, the diffusion used for light spreads in the XZ plane (see FIGS. 2 and 4a) is desirably limited in extent in the direction of any plane that intersects with the output port of the integrator. As the diffuser will not only smear out the shadows, but also enlarge the angular width of the incoming beam, it should have a limited response along this meridian, so that light from the input beam does not exit directly in any appreciable amounts from the linear exit port 54 but rather substantially all the light still experiences internal reflections within the integrating cylinder 50. On the other hand, for light diverging in any plane that does not intersect with the exit port, and primarily in the YZ plane which is parallel to the linear exit port 54, the diffusion from the light shaping diffuser 43 can be rather large. Light shaping diffuser 43 is therefore preferably elliptical with a narrow angular diffusion in a first direction (XZ plane that intersects with the exit port 54), and wide diffusion in the direction perpendicular to the first direction. The light shaping diffuser 43 should also be highly efficient, so as to maximize the available light throughput from the linear exit port 54.

Figure 3C:
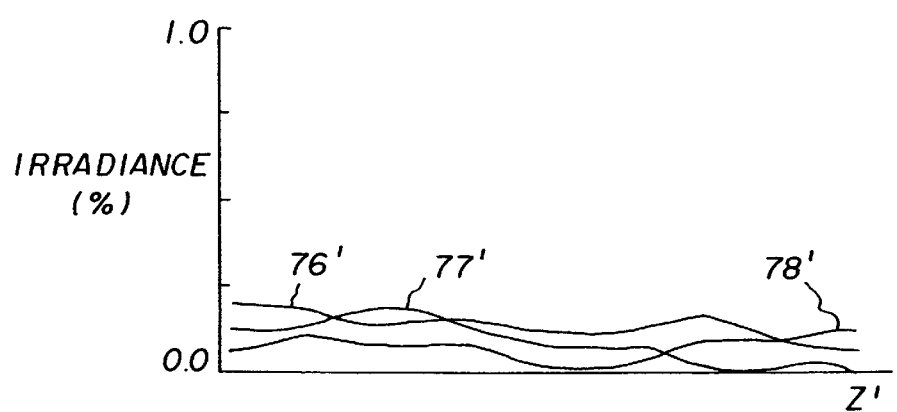
FIG. 3c is an expanded view of a portion of the FIG. 3b graph showing the improved local behavior for the system with the changes employed per the present invention.

The light shaping diffuser 43 is preferably a holographic diffuser, such as manufactured by Physical Optics Inc. of Torrance Calif. Holographic diffusers offer the advantage that the amount of angular light diffusion is a controllable parameter. In particular, holographic diffusers can provide limited diffusion (<1°), out to Lambertian diffusion (90°), in either a circular or elliptical fashion, as is needed by a particular design. The angular response of very narrow diffusers (<2°) tends to be lorentzian in shape, while the moderate angle diffusers (about 5°–20°) have an approximately gaussian diffusion response, and the wide angle (about >20°) diffusers have an approximately level diffusion over a large central angular range, beyond which the diffusion gradually tapers off. These diffusers are not only also very efficient (>90% trans. w/o AR coating), diffusing the light with very little backscatter, but they also work well with white light. An elliptical holographic diffuser can meet the general requirements for the light shaping diffuser 43. For example, a test was done with a telecine film scanner using a 20°×80° elliptical diffuser. In this test, the input optical system produced an input beam with about 28° divergence, oriented at about 13° into the end input illuminated integrator. The integrating cylinder 50 had a cavity diameter of 20 mm, a cavity length 31 mm, and a linear exit port 54 which is 27 mm long and 2.8 mm wide. The input port was 6.5 mm in diameter with a 3 mm decentration. The 20°×80° elliptical diffuser was placed at the focal plane $a_2$ of the input beam, with the narrow (20°) diffusing direction aligned to the XZ plane, and with wide (80°) diffusing direction aligned to the YZ plane. With this diffuser installed, the initial residual dynamic micro-fluctuations 76', 77', 78' depicted in FIG.3b were reduced by about 4× to about 0.15% pp (as shown in FIG.3c), or −56 dB, which is just below the perceptibility threshold. Use of the light shaping diffuser 43 introduced negligible losses in the effective efficiency of the integrating cylinder 50 as measured by the light levels exiting the linear exit port 54. The overall uniformity of the light profile across the linear exit port 54 was likewise unaffected. In a very similar fashion, the light shaping diffuser 43, with anamorphic diffusion, could be used in conjunction with an input optical system and the top input illuminated integrating cylinder 50 of FIG. 4b.

Figure 5:
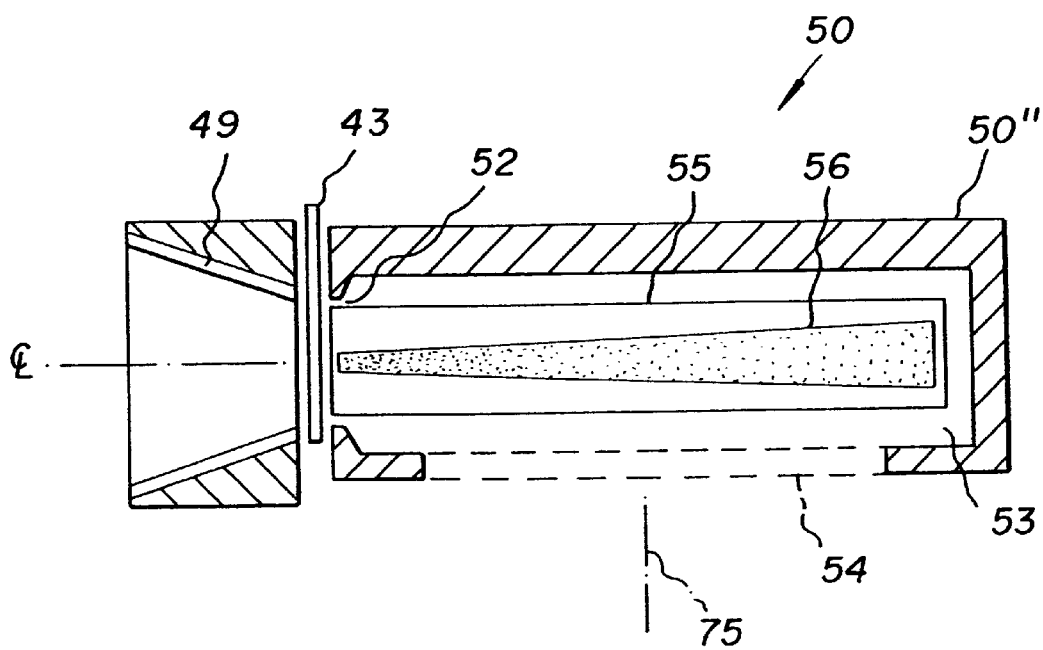
FIG. 5 is a schematic elevation view of a linear light source utilizing a glass rod positioned inside an integrating cavity with a light shaping diffuser of the invention.

The light shaping diffuser 43 can be used effectively in conjunction with the integrating cylinder 50" of FIG. 5, which includes light pipe 55, as depicted in FIG. 5. In an integrating cylinder of this type, the light pipe 55 has a diffusing area 56 patterned on it, by means of grinding, etching or coating of the glass surface. Light incident into the cavity is input directly into an end face of the light pipe wherein it propagates through the cavity by means of total internal reflection. Where the light encounters the diffusing area 56, some of the light is scattered out of the light pipe and into the integrating cylinder 50". After further internal reflections within the cavity, the light eventually exits through the exit port 54. A light shaping diffuser 43 is placed in front of the input port end face of the light pipe. The enhanced light homogenizing effect of the cavity and light pipe together is further enhanced by the light beam diffusion introduced by light diffuser 43 which compensates for the adverse temporal effects on spatial uniformity created by gas turbulence and arc wander in the light source.

Figure 6:
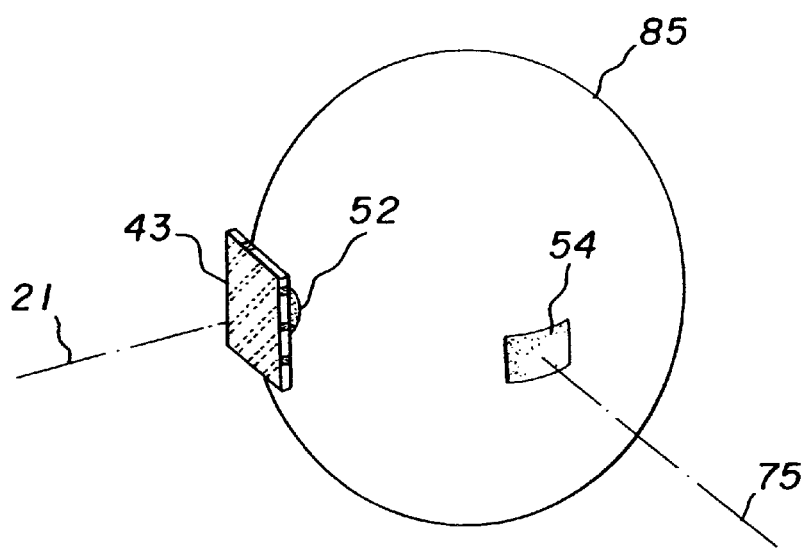
FIG. 6 is a perspective view of a linear light source comprising a cladded light rod with a light shaping diffuser of the invention.

Alternately, light shaping diffuser 43, as used with either the end input illuminated, or top input illuminated, integrating cylinders 50 or 50', could be a circular diffuser rather than an elliptical diffuser. Optimally, a circular light shaping diffuser would only be used with an integrating cavity which has a different geometry, cavity shape, cavity size, or port locations, such that the linear exit port 54 does not limit the angular extent of the diffusion as in the cases described above. However, the light shaping diffuser 43 still may have wide circularly symmetrical diffusion, such that it directs some light directly out the linear exit port 54, and yet provide acceptable performance. In such a case, with the integrating cylinder geometries described earlier, this direct light will emerge from the linear exit port 54 at large angles relative to the imaging lens optical axis 75. As the imaging lens 70 collects light only in a narrow cone (such as +/−9°), it cannot collect this high angle light, and the light across the linear exit port will still appear uniform as seen by the sensor array 80. This direct exiting high angle light will distort the essentially lambertian angular emission profile of the integrating cylinder 50, but it may be only marginally evident as slight differences in the scratch suppression provided by the cylinder, depending on the orientation and position of the scratches on the film 65. The use of a large angle circular light shaping diffuser 43 will cause the overall light level across the slit, as collected by the imaging lens 70, to be reduced, thereby reducing the apparent cavity efficiency. A test with a 60° circular light shaping diffuser and the end input illuminated cylinder described earlier was undertaken, and the residual microfluctuations were successfully minimized (<−55 dB) without a loss in the apparent illumination uniformity as perceived by the sensor array 80. Although the various embodiments of this invention describe the light shaping diffuser 43, being used in combination with an input optical system and an integrating cylinder illuminator, it could be used with an integrating sphere illuminator as well (FIG. 6).

The foregoing examples involve the use of a generally cylindrical cavity integrator. It will be appreciated that the light diffuser may be used with a spherical integrator cavity 85 (FIG. 6) and substantially the same benefits obtained thereby.

The light shaping diffuser should be placed preferably in proximity to the beam focal plane $a_2$ shown in FIG. 2. Should the light shaping diffuser 43 be placed several mm before the focus, such as adjacent to the third condensing lens 43, this would have the undesirable effect of creating a partial pre-integration chamber, which would reduce the overall cavity light efficiency. Furthermore, when combined with an end input illuminated integrating cylinder, the spatial distribution of the incoming light across the bottom wall of the cavity would be disturbed, thereby altering the uniformity of the light exiting the linear exit port 54. Nominally, then a pocket would be created in the input port 52, such that the light shaping diffuser 43 can be located near the beam focus at the $a_2$ plane, with perhaps keying features to align a elliptical light shaping diffuser with the narrow diffusion oriented parallel to the plane bisecting the linear exit port 54. Optimally the light shaping diffuser 43 should be mounted so that the optical axis 13 of the incoming beam is normal to the diffusing surface. The tolerance on this alignment however isn't particularly critical, however, and the diffuser can be oriented off normal by several degrees.

It should be understood that although other arrangements of the optics within the illumination optical system are possible, the beneficial need for the light shaping diffuser 43 is not necessarily removed. For example, the illumination input optical system 20 could be redesigned so that lamp window (plane $b_0$) was conjugate to the input port beam focus, rather than the arc plasma (plane $a_0$) being conjugate to the input port beam focus. In this case, the far field region of the arc lamp, where the gas turbulence is quite visible as spatial disturbances, would be located at the input port. Then as the input beam propagated forward into the integrating cylinder, it would become increasingly gaussian, and the turbulence induced fluctuations would become less visible. Nonetheless, these fluctuations would be present and detectable within a significant portion of the cavity of the integrating cylinder 50, and therefore the light shaping diffuser 43 would still be useful in reducing the magnitude of these fluctuations. Likewise, the entire condensing assembly 38 could be replaced by a non-imaging optic, such as a compound parabolic concentrator (CPC). This will, in similar fashion to the lens system of FIG. 2, produce both a highly aberrated focussed spot and a highly aberrated far field at the cavity. However, these aberrations are not likely sufficient to remove the dynamic shading problem by themselves.

It should also be understood that although this invention has been described in the context of usage with a xenon arc lamp light source, that it could be applied with other arc lamp sources, or even other lamp sources other than arc lamps where a dynamic spatial distortion problem exists within the beam.

The invention has been described in detail with particular reference to certain preferred embodiments thereof, but it will be understood that variations and modifications can be effected within the spirit and scope of the invention.

Parts List

(10) film scanner
(20) illumination optics system
(21) first optical axis
(25) light source
(26) electrode
(26a) electrode supports
(27) reflector
(30) power supply
(31) aperture mechanism
(34) relay lens
(35) second relay lens
(38) condensing assembly

(39) first condensing lens
(40) second condensing lens
(41) third condensing lens
(43) light shaping diffuser
(49) tapered light collector
(50) integrating cylinder
(52) input port
(53) cavity
(54) exit port
(55) light pipe
(56) diffusing surface area
(57) light sampling means
(58) illumination control circuit
(60) film gate
(65) film
(70) imaging lens
(75) imaging lens optical axis
(80) sensor array
(85) spherical integrator cavity

What is claimed is:

1. Light integrating apparatus for producing a spatially homogenized illuminating region of output light from an intense beam of input light comprising;
   an integrating module having diffusely reflecting walls defining an input port through which said beam of input light is introduced into said module and an exit port through which the output light exits after multiple reflections within said module; and
   a light shaping diffuser positioned at the input port, the diffuser having a light shaping diffusion characteristic which diverges the beam of input light at the input port without significantly increasing direct transfer of input light to said exit port.

2. The light integrating apparatus of claim 1 in which said diffusion characteristic is such as to create a light intensity cross section profile that is asymmetric such that angular diffusion of the input light is lesser in any plane that intersects with said exit port than in any plane that does not intersect with the exit port.

3. The light integrating apparatus of claim 1 in which said light shaping diffuser has an elliptical diffusion characteristic with its major axis of diffusion substantially orthogonal to a plane of intersection with said exit port.

4. The light integrating apparatus of claim 3 in which said elliptical diffusion characteristic is about 20°×80° diffusion.

5. The light integrating apparatus of claim 1 in which light shaping diffuser has a circular diffusion characteristic.

6. The light integrating apparatus of claim 5 in which said circular diffusion characteristic is about a 60° cone of diffusion.

7. The light integrating apparatus of claim 1 wherein said light shaping diffuser is a holographic diffuser.

8. The light integrating apparatus of claim 1 wherein said light integrating module comprises an elongated cylindrical integrating cavity having an elongated curved wall parallel with a long axis of the cavity and said exit port comprises a slit parallel to the long axis of the cavity through which a line of illumination exits.

9. The light integrating apparatus of claim 8 wherein the cylindrical cavity terminates in end walls and said input port is located in an endwall of the cavity.

10. The light integrating apparatus of claim 8 wherein said input port is centrally located in said elongated curved wall of the cylindrical cavity.

11. The light integrating cavity of claim 1 wherein said light integrating module comprises an elongated cylindrical integrating cavity having a light pipe in the cavity and an input port located on an end wall of the light pipe, the light pipe having a diffusing area patterned on it.

12. The light integrating apparatus of claim 1 wherein said light integrating cavity comprises a spherical cavity.

13. An illumination system for a film scanner comprising;
   a light source having an output light beam;
   optical means for condensing the output light beam into a focused light beam having spatial and temporal light intensity variations distributed along an optical axis of the beam;
   a light integrating module having (a) a light input port positioned in the optical axis of the focused light beam, (b) diffusely reflecting interior walls and (c) an exit port through which illumination from said light beam exits the module after multiple reflections within the module; and
   a light shaping diffuser positioned at said input port, the diffuser having a light shaping diffusion characteristic which diverges the beam of input light at the input port without significantly increasing direct transfer of light from said input port to said exit port.

14. An illumination system for a film scanner comprising:
   a light source having an output light beam;
   optical means for condensing the output light beam into a focused light beam having spatial and temporal light intensity variations distributed along an optical axis of the beam;
   a light integrating module having (a) a light input port positioned in the optical axis of the focused light beam, (b) diffusely reflecting interior walls, and (c) an exit port through which illumination from said light beam exits the module after multiple reflections within the module; and
   a light control system which modifies the operation of the light source to reduce temporal variations in the light level within said light integrating module using light collected through a light sampling means;
   a light shaping diffuser positioned at said input port, the diffuser having a light shaping diffusion characteristic which diverges the beam of input light at the input port to reduce the magnitude of time varying shadows present within said beam of input light as seen as dynamic shading in the output light existing through the exit port without significantly increasing direct transfer of light from said input port to said exit port.

15. An illumination system for a film scanner comprising;
   a light source having an output light beam;
   optical means for condensing the output light beam into a focused light beam having spatial and temporal light intensity variations distributed along an optical axis of the beam;
   a light integrating module having (a) a light input port positioned in the optical axis of the focused light beam, (b) diffusely reflecting interior walls, and (c) an exit port through which illumination from said light beam exits the module after multiple reflections within the module; and
   a light source control means which corrects for temporal variations in the light level within said light integrating module using light collected through a light sampling means; and
   a light shaping diffuser positioned at said input port, the diffuser having a light shaping diffusion characteristic which diverges the beam of input light at the input port without significantly increasing direct transfer of light from said input port to said exit port.

* * * * *

UNITED STATES PATENT AND TRADEMARK OFFICE
CERTIFICATE OF CORRECTION

PATENT NO. : 6,542,179 B1
DATED : April 1, 2003
INVENTOR(S) : Allen D. Bellinger et al.

It is certified that error appears in the above-identified patent and that said Letters Patent is hereby corrected as shown below:

<u>Column 8,</u>
Lines 60-64, replace sentence beginning with "With" as shown:
-- With this diffuser installed, the initial residual dynamic micro-fluctuations lines 76, 77, 78 depicted in FIG. 3b were reduced by about 4x to about 0.15% pp lines 76', 77', 78' (as shown in FIG. 3c), or -56 dB, which is just below the perceptibility threshold. --.

Signed and Sealed this

Fourth Day of May, 2004

JON W. DUDAS
*Acting Director of the United States Patent and Trademark Office*